United States Patent
Cervantez

[15] 3,649,041
[45] Mar. 14, 1972

[54] VEHICLE-ATTACHABLE CARRIER FOR A WORKMAN AND A SUPPLY OF IRRIGATION TUBES

[72] Inventor: Teodoso Cervantez, Hereford, Tex.
[73] Assignee: J. B. Haile, Hereford, Tex. a part interest
[22] Filed: Mar. 19, 1970
[21] Appl. No.: 21,004

[52] U.S. Cl. ..........................280/32.5, 214/450, 214/151, 224/42.44, 280/150.5, 280/401
[51] Int. Cl. ..................................................A01d 67/04
[58] Field of Search ....................280/32.5, 32.7, 150, 150 A, 280/150 F, 34, 413, 472, 473, 400, 401, 150.5; 119/15.5; 214/151, 450; 224/42.43, 42.44, 42.46

[56] References Cited

UNITED STATES PATENTS

| | | | |
|---|---|---|---|
| 2,825,573 | 3/1958 | Shaw et al. | 280/34 |
| 2,523,832 | 9/1950 | Kunkel | 280/32.5 |
| 2,501,112 | 3/1950 | Webster | 214/151 X |
| 2,126,083 | 8/1938 | Bailey | 280/150 A X |
| 1,546,617 | 7/1925 | Caldwell et al. | 280/43 |
| 3,455,404 | 7/1969 | Hansen | 280/43 X |
| 2,704,158 | 3/1955 | Long | 280/32.5 UX |
| 1,620,039 | 3/1927 | Robertson | 214/151 X |
| 2,646,909 | 7/1953 | Barden | 280/150 R UX |

FOREIGN PATENTS OR APPLICATIONS 449,202  6/1948  Canada..............................119/15.5 A Primary Examiner—Benjamin Hersh
Assistant Examiner—John P. Silverstrim
Attorney—A. Yates Dowell and A. Yates Dowell, Jr.

[57] ABSTRACT

The invention is a vehicle-attachable carrier for an operator or workman and a supply of irrigation siphoning tubes frequently set and reset in an irrigation ditch for supplying water from the ditch to adjacent farmland. The device is a generally rectangular frame or rack supported at one end on a vehicle such as a pickup truck or on a three-point hitch of a tractor or the like with at least a portion of the device swingable over a ditch when in use or retracted when not in use to a position close to the vehicle for transportation purposes, the carrier having a seat for a workman and accessible to said seat a supply of irrigation tubes which the workman can apply when the rack is in its extended operative position.

3 Claims, 9 Drawing Figures

Patented March 14, 1972
3,649,041
2 Sheets-Sheet 1
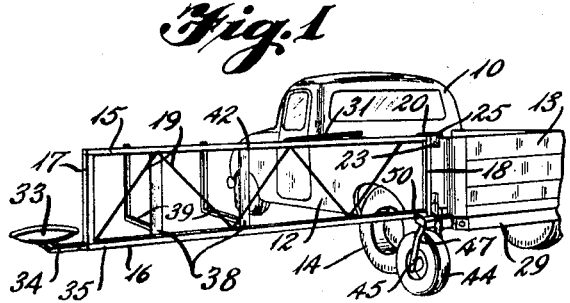
INVENTOR
TEODOSO CERVANTEZ
BY
ATTORNEYS

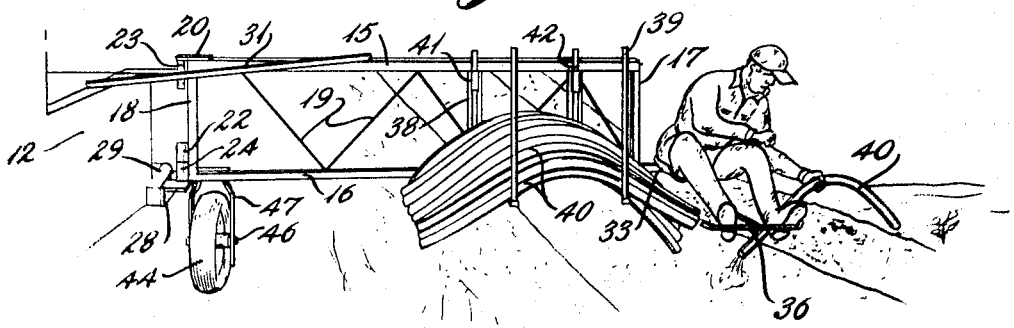

VEHICLE-ATTACHABLE CARRIER FOR A WORKMAN AND A SUPPLY OF IRRIGATION TUBES

BACKGROUND OF THE INVENTION

1. Field of the Invention

The invention is in the field of water distribution, whether supplied or removed, in agriculture, land drainage, irrigation, and the like. In certain types of irrigation, it has been customary for workmen to wear irrigation boots and wade in water to set and reset siphoning tubes; this has been laborious, time consuming, and influenced by the length of the rows, the texture of the soil, and other factors. The labor shortage is acute, consequently adequate labor-saving equipment is imperative.

2. Description of the Prior Art

Various types of vehicles have been provided for the transportation of laborers and equipment, although none has been provided to carry a workman and a convenient supply of irrigation tubes for installation to siphon water from irrigation ditches to adjoining farm land.

SUMMARY OF THE INVENTION AND OBJECTS

The invention is a simple, inexpensive, easily produced, generally rectangular, skeleton-type rack of light weight for pivotal mounting on a vehicle so that it can be disposed in operative position extending out over an irrigation ditch or collapsed against the vehicle to reduce the amount of space required in its movement from one place to another. The device carries a seat for a workman and a rack for irrigation tubes located conveniently thereto. The device carrying the man and the tubes can extend outwardly over a ditch and makes it possible for a vehicle such as a pickup truck or tractor which supports the same to move along the ditch. A workman carried on the device may set siphon tubes at the rate of five to 10 per minute so that such tubes can siphon water from the irrigation ditch onto adjacent farmland. It might appear that the frame of the device would not sustain the weight of a workman, but would cause the mounting vehicle to tip over; however, it has been found to sustain a workman weighing 220 pounds and 70 aluminum tubes approximately 2 inches in diameter and 4 feet long with no stress and without the end dropping down toward the ditch. This is due in part to the use of an auxiliary or gauge wheel which carries the weight and is as close to the vehicle as possible so that the vehicle does not have to move too close to the irrigation ditch, and the carrier is maintained substantially horizontal even when the wheel of the vehicle enters a hole.

It is an object of the invention to provide a simple, inexpensive carrier for a workman and a convenient supply of irrigation tubes, which carrier can be mounted on a vehicle such as a pickup truck or by means of the three-point hitch on a tractor or the like, and which can be disposed collapsed against the vehicle during transportation and extended for location over a ditch with a workman and siphoning tubes carried thereon so that they can be readily installed by the workman to remove water from the irrigation ditch and discharge it onto adjacent farmland with a substantial saving in time and expense over that heretofore possible when such work is done by a workman on foot, even if labor were available, which is not the case.

BRIEF DESCRIPTION OF THE DRAWINGS

FIG. 1 is a perspective of one embodiment of the invention applied to a pickup truck and with the carrier extended;

FIG. 2, a similar view of the carrier collapsed against the side of the pickup truck;

FIG. 3, a top plan view;

FIG. 4, an enlarged perspective of the manner of mounting the carrier;

FIG. 5, a section on the line 5—5 of FIG. 4;

FIG. 6, a perspective of the carrier extended supporting irrigation tubes and a workman applying the tubes;

FIG. 7, a perspective of the invention applied to the three-point hitch of a tractor;

FIG. 8, an exploded view of the gate and its mounting viewed from the opposite side of that of FIG. 7; and FIG. 9, an enlarged view of the device of FIG. 7 collapsed.

DESCRIPTION OF THE PREFERRED EMBODIMENT

Referring to the drawings, in FIGS. 1–6 the invention is mounted on a pickup truck 10, while in FIGS. 7–9 the invention is mounted by means of the three-point hitch on a tractor 11.

The pickup truck 10 is of conventional construction and includes side panels 12, a tailgate 13, and wheels 14. The carrier of the present invention includes top and bottom rails 15 and 16 which may be of any desired character such as, for example, extruded tubing of rectangular or other desired cross section, and provided with connecting posts 17 and 18 at its opposite ends and intermediate angularly disposed braces 19 throughout its length.

In order to mount the same on the pickup truck, the generally rectangular carrier is provided with a strap 20 carrying a pivot pin 21, with the strap welded or otherwise secured to the top rail 15. The post 18 is provided with a pivot pin 22 fastened by welding 22' or other desired means and adjacent the end of the lower rail 16. The pivot pins 21 and 22 are adapted to be received in upper and lower sleeve sockets 23 and 24. The upper sleeve socket 23 is carried by a bracket 25 secured by bolts 26 to the top surface of the side panel 12. The lower sleeve 24 is mounted on a flat member or plate 27 carried by a bracket 28 and fastened to the bumper 29 of the truck by means of bolts 30. Thus the pivot pins 21 and 22 of the carrier located in the sleeves 23 and 24 can be swung from a collapsed position adjacent the vehicle to an extended operative position and held in such operative position by means of a bar 31 with pin and socket connections 32 with the side panel 12 and upper bar 15 of the carrier. Thus, the carrier may be disposed at right angles to the direction of movement of the vehicle.

In order to support a workman, a seat 33 is mounted on a right angular bracket 34 slidable in the lower horizontal member 16 of the carrier and is adapted to be fastened in fixed adjusted position by means of a pin 35. A footrest 36 is carried on a bar 37 adjustable within the bracket 34. Thus the seat may be adjusted lengthwise upon the end of the carrier and relative to a support for tubes.

The tube support comprises a pair of spaced, upright straps 38 having their ends fixed to the upper and lower bars 15 and 16.

Against these straps 38 rest a pair of spaced, U-shaped brackets 39 for holding irrigation tubes 40 (FIG. 6). It is desirable that these brackets be vertically adjustable and for this purpose one of the legs of each of the brackets is received in a sleeve 41 of rectangular or polygonal cross section for vertical nonrotary sliding movement. Pins or bolts 42 extend through the bracket and the upper bar 15 for securing the parts in fixed relation. Thus the brackets can be adjusted vertically, and in order to support them against movement along the bar 16 a pair of fixed bosses 43 are provided attached along the opposite edges of the straps 38. In view of the fact that the bracket and the sleeve 41 are of polygonal cross section, the bracket will be maintained at right angles to the carrier in appropriate position for receiving and holding the irrigation tubes 40.

The weight of a man and a supply of tubing on the carrier will tend to cause the carrier to dip at its outer end. To compensate for this and to maintain the carrier in a substantially horizontal position, notwithstanding that the adjacent wheel of the vehicle passes over depressions in the road causing the truck body to move up or down, a gauge wheel 44 is provided carried by the bracket 28. The gauge wheel 44 has a shaft 45 located in one of a series of vertical openings 46 in a yoke 47, the top of the yoke being fixed to a U-shaped frame 48 having a sleeve 49 in which a shaft 50 is journaled. This shaft 50 is removably retained in a sleeve 51 welded or otherwise secured to the plate 27 and the bracket 28.

In order to retain the shaft 50 within the sleeve 51, a T-shaped pin 52 is provided; when this pin is withdrawn, the shaft 50 and the entire wheel assembly can be detached from the vehicle. In order to secure the wheel assembly in fixed relation either in contact with the earth or elevated, the frame 48 is provided with a pair of spaced openings 53 for the receipt of a pin 54 having a right angular operating arm 55. The plate 27 is provided with a sleeve 56 in which the pin 54 is rotatable, and the plate also is provided with a slot 57 so that when the arm 55 is in downward position endwise movement of the pin 54 is prevented and by rotating the arm to an upright position, or approximately 180° from its locking position, the pin can be retracted to allow its change from one of the openings 53 to the other and thus the wheel assembly to be disposed either in a supporting or nonsupporting position.

As illustrated in FIG. 6, the wheel 44 is in engagement with the earth, the carrier is extended over an irrigation ditch with a workman supported on the seat 33 and irrigation tubes 40 are carried in the brackets 39. Thus the workman can install the tubes for siphoning water from the ditch to the adjacent farmland.

Instead of the carrier being mounted on a pickup truck, it may be mounted on a tractor 11 by means of an auxiliary frame and a three-point hitch, as illustrated in FIG. 7. The auxiliary frame includes upper and lower bars 58 and 59 with end posts 60 and 61 and angular braces 62. For attachment to the three-point hitch of a tractor, a yoke 63 is attached to the upper bar 58 and perforated lugs 64 are attached to the lower bar 59 and spaced corresponding to the spacing of the three-point hitch. In order to provide means for mounting the carrier on this auxiliary frame, upper and lower hinge-forming sleeves 65 and 66 are welded or otherwise secured to the rear surface of the post 61. The sleeves 65 and 66 are adapted to receive the pins 21 and 22 of the carrier. Thus the carrier can be mounted on the tractor similarly to its mounting on the pickup truck and the carrier can be held by a bar 31 extending between the frame and the tractor for maintaining the carrier in proper operating position. A stop 67 preferably is provided for limiting the forward swinging movement of the carrier on the tractor-supported frame. When the carrier is pivoted in the sleeves 65 and 66 in a collapsed position behind the vehicle adjacent to the auxiliary supporting frame, it can be held in such position by means of a hinged latch 68 on the end of the auxiliary frame remote from the opposite end to which the sleeves which receive the pins of the carrier are attached.

The main body of the carrier is the same regardless of the type of vehicle on which it is supported, although the method of attachment is slightly different. When the carrier is mounted on a tractor, a gauge wheel is unnecessary.

I claim:

1. A carrier removably mounted on a propelling vehicle for supporting a workman and a supply of irrigation tubes over an irrigation ditch, said carrier comprising an elongated frame having spaced upper and lower members connected together by a post at each end, means for swingably connecting one end of said frame to said vehicle, said connecting means including a pair of vertically aligned sleeves carried by one of said frame and vehicle and a pair of cooperating pivot pin means carried by the other of said frame and vehicle, said pivot pin means being removably received within said sleeve means, a workman supporting seat fixed to a mounting bracket, said bracket being adjustably mounted on the opposite end of at least one of said upper and lower frame members so that said seat is disposed outwardly therefrom in a position remote from the vehicle, a pair of generally parallel braces connecting said upper and lower frame members adjacent to said opposite end, a U-shaped bracket vertically adjustably mounted on each of said braces and disposed substantially normal to said frame for supporting a plurality of irrigation tubes adjacent to said seat, and means for maintaining said frame in fixed operative position at an angle to the direction of movement of said vehicle, whereby said frame is cantilevered outwardly from said vehicle in operative position to support a workman over an irrigation ditch and said frame can be swung to an inoperative position adjacent to said vehicle and selectively removed therefrom.

2. The structure of claim 1 including a gauge wheel and means for mounting said gauge wheel adjacent to said vehicle for providing additional support for said carrier.

3. The structure of claim 2 in which said gauge wheel mounting means includes a yoke rotatably supporting said gauge wheel, said yoke being rotatably mounted on a shaft, sleeve means on said vehicle, means for removably retaining said shaft in said sleeve means so that said yoke and said gauge wheel are rotatably mounted about said shaft, and lock means for locking said yoke in supporting and nonsupporting positions.

* * * * *